June 5, 1956  M. M. ARLIN  2,748,936
GAUGING MEANS
Filed Feb. 23, 1951  4 Sheets-Sheet 1

INVENTOR.
Max M. Arlin.
BY
Harness, Dickey & Pierce
ATTORNEYS.

June 5, 1956  M. M. ARLIN  2,748,936
GAUGING MEANS

Filed Feb. 23, 1951  4 Sheets-Sheet 3

INVENTOR.
Max M. Arlin.
BY
Harness, Dickey & Pierce
ATTORNEYS.

FIG. 5.

INVENTOR.
Max M. Arlin.

United States Patent Office 2,748,936
Patented June 5, 1956

2,748,936
GAUGING MEANS

Max M. Arlin, Detroit, Mich., assignor to Arlin Products, Incorporated, Detroit, Mich., a corporation of Michigan Application February 23, 1951, Serial No. 212,246

16 Claims. (Cl. 209—88)

This invention relates generally to gauging apparatus and more particularly to apparatus for gauging the wall thickness of a member which may be an annular member having an outer cylindrical surface and an inner cylindrical surface.

An object of this invention is to provide a new and improved apparatus of the character described.

Another object of this invention is to provide such a gauging apparatus which is rapid in its operation.

Another object is to provide such an apparatus which will gauge the eccentricity of two cylindrical walls with extreme accuracy.

Another object of this invention is to provide such a gauging apparatus which is automatic in its operation.

Another object is to provide such an apparatus which is extremely efficient, economical of manufacture and requires a minimum of servicing.

Other objects will be apparent from the specification, the appended claims and the drawings, in which drawings.

Fig. 6 is a diagrammatic view of the mechanical cams and their relation to the sequencing switches;

In the form shown, the invention is arranged for measuring the concentricity of two cylindrical surfaces of a hollow tubular bearing sleeve. This gauging is performed in such a manner that the actual thickness of the annular wall between said surfaces, or the degree of eccentricity with which said sleeve is presented to the measuring or gauge head, will not be gauged and will not affect the eccentricity reading.

The apparatus generally provides an electrical network 1 (Fig. 8) actuated by a gauge head 2 which is provided with two sets of contacts 4—5 and 6—7. If merely one set of contacts 4—5 or 6—7 close during the measuring operation, then there is no rejection of the part but if both sets 4—5 and 6—7 close during such measuring operation the network will reject the sleeve. In the cycle of operation, a sleeve 8 is placed on a collet 10 which positions the annular wall thereof between two radially movable anvils or fingers 12—14. The anvils 12 and 14 are preferably semi-spherical in shape and made of a wear resisting material. For example they may be made of Carboloy balls brazed to the supporting members. The fingers or anvils 12—14 are relatively movable and since they engage opposite surfaces of the sleeve wall will be spaced apart by the sleeve 8 a distance equal to the thickness of the wall therebetween. The collet 10 is suitably rotated as by an electric motor 16 to present the entire periphery of the sleeve between the anvils.

In order that transient effects which may occur immediately subsequent to the placing of the sleeve on the collet 10 will not cause a false rejection, a cycle of operation is established which renders the measuring network 1 ineffective for a predetermined period subsequent to placing of the sleeve on the collet to permit stabilization. In the form shown, the collet and sleeve are rotated to aid in the stabilization, but such rotation might be omitted in some instances. After such stabilization period, the network is conditioned to respond to the actuation of the sets of contacts 4—5 and 6—7 during at least one complete revolution of the collet and sleeve after which time the verdict or answer is held by the network so that the segregating gate 18 which is controlled by the network 1 is maintained in the desired position for directing the sleeve into the proper receptacle upon actuation of the mechanism for ejecting the sleeve from the collet. Such ejection occurs during the answer or verdict holding portion of the cycle. After the workpiece has been ejected from the collet and time for it to have passed the segregating gate has expired, the network is returned to its original condition ready to gauge a subsequent sleeve.

The sequence steps is controlled by a set of cams 20, 21, 22, 23 and 24 driven at reduced speed relative to the collet 10. In the form shown, the motor 16 continually drives the collet through a lay shaft 26 by means of belts 27 and 28. The controlling cams 20—24 are releasably clutched for rotation by the lay shaft 26 and are normally held against rotation with such lay shaft 26 by a dog 30. As the sleeve is placed over the collet 10, its forward edge engages an operating arm 32 of a cam switch 34 which energizes a solenoid 36 to lift the dog 30. Lifting of the dog 30, permits the cams 20—24 to be rotated by the lay shaft 26.

The cams 20—24 actuate a series of network controlling switches, to be described in greater detail hereinafter, which initially hold the network ineffective to respond to the gauge head switches 4—5 and 6—7 to permit the stabilization thereof and the occurrence of transient effects as above noted. After a predetermined time, the cams 20—24 render the network sensitive to the gauge head switches 4—5 and 6—7 during which period the proper circuit condition is established for the segregating gate 18. The network 1 then holds the answer and the gate 18 in the proper position while the cams 20—24 actuate a solenoid 38 to eject the measured sleeve down a chute 40 where the previously set segregating gate 18 directs the sleeve into the proper bin. Later the cams 20—24 remove the answer from the network and reset the apparatus for a subsequent operation.

As shown, the lay shaft 26 rotates at one half the speed of the collet 10. The cams 20—24 are arranged such that the first 70° of their rotation permits the establishment of stable conditions, the next 200° permits the gauge head 2 to actuate the network 1, and the remaining 90° causes the sleeve to be ejected and the network 1 reset to original conditions. The cams 20—24 also act to de-energize the dog actuating solenoid 36 so that subsequent to initial rotation of the cams 20—24 in which the dog engaging shoulder 42 of the cam 20 has moved beyond the dog 30, the dog 30 is released to engage this shoulder 42 and permit only one complete rotation of the cams 20—24 for each sleeve inserted on the collet 10.

Any conventional form of mechanism may be used to feed the sleeves to the collet or they may be manually placed thereon. Any suitable discharge chute having a segregating gate for directing ejected measured sleeves into bins for "go" and "no go" sleeves. Since the particular construction of such loading mechanism forms no part of the invention it has been omitted for simplicity and the discharge chute 40 has been shown only diagrammatically since it, apart from the connection with the gate 18, also forms no part of the present invention.

The gauging head 2 comprises a boxlike casing 44 having integral rear, top and side walls 45, 46, 47 and 48 and a removable front wall plate 49. The bottom side of the casing 44 is closed by a beam 50 having a cutaway portion intermediate its ends 52 and 54 forming a flexible bridge 56 whereby the end portion 52 may have limited rotation or oscillation about the end portion 54. The lower end of the wall 48 terminates slightly above the lower end of the rear wall 45 and the immovable end portion 54 of the beam 50 is rigidly secured thereto as by one or more screws 60. The beam 50 is rigid except for the cutaway portion forming the flexible bridge 56 connecting the portions 52 and 54. The bridge 56 is of full width of the beam 50 and permits limited oscillation of the portion 52 about an axis normal to the rear wall 45.

The beam end portion 52 has a through aperture 62 which snugly receives a pin or shaft 64. The shaft 64 is immovably held within the aperture 62 by a transversely extending pin 66. The lower end of the shaft 64 extends below the casing 44 and is convex in shape and may be hardened to prevent wear or may be a Carboloy ball brazed thereto and provides the first or movable anvil 12 which is adapted to engage the outer surface of the sleeve to be measured. The upper end of the shaft 64 extends within the casing 44 and carries a contact carrying yoke 70. An L-shaped member 72 has one arm 74 adjustably secured to the rear wall 45 of the casing 44 as by screws 75 and its other arm 76 extending beneath the anvil 12 and provided with a protuberance which forms the second or fixed anvil 14. If desired the anvil 14 may be hardened to eliminate wear or may be a Carboloy ball brazed thereto. The adjustment of the member 72 is preferably such that with the beam 50 in an unflexed position the distance between the anvils 12 and 14 will be less than the minimum expected wall thickness of the sleeve 8 or at least less than the minimum wall thickness which is permitted in an acceptable or "go" sleeve.

The yoke 70 has a downwardly extending aperture in which the upper end of the shaft 64 snugly fits. Pins 79 secure the yoke 70 against longitudinal movement relative to the shaft 64. The yoke 70 is provided with spaced substantially parallel arms 80 and 82 which straddle a downwardly extending lateral arm 84 of a T member 86 having its aligned arms 87 and 88 secured as by screws 90 to a block 92 having a longitudinal aperture 93 which snugly receives a shaft 94 carried by the side walls 47 and 48 parallel to the rear wall 45.

The upper end portion of each of the yoke arms 80 and 82 is provided with screw threaded apertures extending in a plane substantially parallel to the rear wall 45 for screw threadedly receiving contact carrying screws, the inner end surfaces of which form the contacts 4 and 6. The upper ends of these arms 80 and 82 are split down through the aperture and locking screws 95 and 96 clamp the split ends together to frictionally hold the contact carrying screws in adjusted position. The T member 86 is preferably fabricated from electrical insulating material such as fiber or a suitable plastic and is provided at its lower end portion with a screw threaded aperture which extends completely through the lateral arm 84.

A flexible leaf spring 98 of current conducting material is secured to the face of the arm 84 facing the contact 4 as by means of a screw 99 threaded into the aforesaid aperture. The screw 99 is short and preferably extends less than half way through the thickness of the arm 84. The upper end of the leaf spring 98 carries the contact 5 which is engageable by the contact 4. Similarly a second flexible leaf spring 100 of current conducting material is secured to the face of the arm 84 facing the contact 6 as by means of a screw 101 threaded into the above mentioned aperture. The screw 101 like the screw 99 is short and preferably extends less than half way through the thickness of the arm 84. By having the screws of this length the leaf springs 98 and 100 are electrically insulated from each other. The upper end of the leaf spring 100 carries the contact 7 which is engageable by the contact 6. Conductors 102 and 103 are respectively connected to the leaf springs 98 and 100 either by soldering directly to the leaf spring or by being clamped beneath the head of the screws 99 and 101 and lead externally of the gauge head 2 to the network 1. The yoke 70, shaft 64, beam 50, and casing 44 are of electrical conducting material and are connected to the grounded side of the network 1 through the metal parts of the gauging apparatus.

In order to provide a motion multiplying action in the head to increase the sensitivity of the gauge head 2, the distance between the center of the shaft 64 and the hinge or bridge 56 is less than the distance between the movable beam end 52 and the contacts 4 and 6 carried by the yoke 70. In practice, it has been found that a 4 to 1 ratio of these dimensions will provide a gauge head which will be accurate to measure eccentricities in the two sleeve surfaces well within plus or minus 0.000010".

The gauge head 2 is supported by means of upper and lower strip spring arms 104 and 106 from a suitable rigid supporting member 108. The strip arms 104 and 106 are preferably in parallel planes extending substantially normal to the rear casing wall 45. The arms 104 and 106 may be suitably secured at one end to the rigid supporting member 108 as by means of clamping block 110 adjustably held to member 108 by one or more screws 109 and the other ends may be secured to the casing 44 as by means of clamping block 111. By supporting the gauge head 2 in this manner the gauge head is permitted to have vertical movement parallel to member 108 as determined by the engagement of the lower or fixed anvil 14 with the inner surface of the sleeve. Since the gauge head is always in fixed relation to the inner surface of the sleeve being measured, the position of the movable anvil 12 with respect to the fixed anvil 14 will always be proportional to the wall thickness of the sleeve between the two anvils. Since the fixed anvil 14 does not move with respect to the gauge head 2, the position of the yoke 70 within the casing 44 will always be a function of the wall thickness of the sleeve portion then positioned between the two anvils.

Upon initial insertion of the sleeve between the two anvils the beam end 52 of the beam 50 will be rotated in a clockwise direction and normally will be rotated sufficiently to cause the contact 4 to engage the contact 5 and to flex the leaf spring 100 into engagement with the lateral arm 84 to cause bodily movement of the T member 86 and the block 92 to the right of the casing 44 along the shaft 94. Due to friction of the block 92 on the shaft 94 and to its inertia and other factors such as the resiliency of the leaf springs 98 and 100 and the rate at which the sleeve is inserted between the anvils, there may be set up transient conditions in which the block may slide too far and cause engagement of the contacts 6 and 7 or may even temporarily oscillate back and forth to cause periodic opening and closing of the contacts 4—5 and 6—7. In a very short time, however, such transient conditions due to insertion of the sleeve wall between the anvils will cease and stable conditions will result and the position of the contacts 4—5 and 6—7 will be determined solely by the wall thickness appearing between the anvils 12 and 14. As the sleeve is rotated by the collet 10, a larger wall thickness will cause more clockwise rotation of the beam end 54, tending to close the contacts 4 and 5 and perhaps to slide the assembly 86 farther to the right, and a lesser wall thickness will cause a counterclockwise rotation of the beam end 52, tending to close the contacts 6 and 7. The screws carrying the contacts 4 and 6 are adjusted with respect to the normal unflexed position of the leaf springs 98 and 100 such that oscillation or rotation of the beam end 52 by differences in wall thickness of the sleeve which are within the tolerance limits will not both engage their respective contacts 5 and 7 although one or the other of the sets of contacts 4—5 or 6—7 may be closed. The network 1, as stated above, will not actuate the segregated gate 18 for rejecting the piece unless both of the sets of contacts 4—5 and 6—7 have been closed.

From the foregoing it will be apparent that the gauge head 2 within its operating range will be insensitive to absolute magnitudes of wall thickness of the sleeve and will be insensitive to any bodily movement of the sleeve with respect to the gauge head 2 and will be sensitive solely to variations in wall thickness. By the provision of set screw 111a the gauge head may be made to measure thickness. In this event the member 92 is locked in position.

The collet 10 is suitably carried on a shaft 112 which is suitably journaled within a support 113 and which is provided with a sheave 114 driven by sheave 115 by means of the endless belt 27. The sheave 115 is in turn mounted upon lay shaft 26 which is journaled in spaced bearings 116 suitably mounted on a supporting frame 117. A sheave 118 is carried on the opposite end of the shaft 26 from the sheave 115 and is connected in driving relation with a sheave 120 as by means of the endless belt 28. The sheave 120 is suitably driven through a speed reducing unit 124 by means of the motor 16. The motor 16 may be arranged to drive the shafts 26 and 112 at any desired speed but the shaft 112 should rotate at at least a 9:5 ratio with respect to shaft 26 so that at least one complete revolution of the collet 10 will be made during the above mentioned 200° of rotation of the lay shaft 26.

A shaft 130 is supported for longitudinal movement within the support 113 and is provided on its outer end with the V-shaped arm 32 suitably held to the shaft as by means of nuts 134. Each of the arms of the V-shaped member 32 is provided at its outer extremity with a wear pad 136 which may be removably secured thereto as by means of cap screws 138. The wear plates 136 may have outwardly facing portions which closely approach but do not touch the outer diameter of the collet 10 but are sufficiently close thereto to be engaged by the inward end surface of a sleeve carried by the collet 10.

The shaft 130 at its end opposite to the arm 32 is provided with a clevis 146 having aligned apertures for receiving a clevis pin 148. A switch operating lever 150 is rotatably secured to the support 113 as by means of pin 152. One end portion of the lever 150 extends into the clevis 146 and is provided with an aperture through which the pin 148 extends. The midpoint of the lever 150 is provided with a cam surface 153 which engages a cam follower roller 154 carried by a flexible arm 156 which actuates the actuating button 158 of the switch 34. The other end of the arm or lever 150 is apertured to receive a pin 160 which extends through aligned apertures in upper and lower links 162 and 164. A pin 166 extends through aligned apertures in the links 162 and 164. The opposite ends of the links are connected to an armature 168 of the ejecting solenoid 38.

The cams 20, 21, 22, 23 and 24 are rigidly secured together as by means of a plurality of through bolts 190 and are provided with aligned central holes 192 through which the lay shaft 26 extends. One of the cams, in this case cam 20, is provided with three radially extending apertures 194 opening outwardly through the outer surface of the cam 20 and inwardly into the central aperture 192. A ball 196 is located in the inner end of each of these apertures and is urged into engagement with the shaft 26 by means of a spring 198 having one end abutting its respective ball 196 and the other end abutting a set screw 200 screw-threadedly received in the outer portion of the aperture 194 to provide a slip drive between the cams 20—24 and the shaft 26. The cam 180 is provided with a cutaway or flattened portion 202 terminating in the dog engaging shoulder 208 and is normally held against rotation with the shaft 26 by means of a shoulder 42 of the dog 30. The dog 30 is pivotally secured to the dog solenoid 36 carried by an upwardly extending supporting arm 212 of the supporting frame 117. Upon energization of the solenoid 36, the dog 30 is raised to rotate the shoulder 42 out of engagement with the shoulder 208 to permit the shaft 26 to drive the cams 20—24 by means of the balls 196. Shortly after initiation of the rotation of the cams, the solenoid 36 is de-energized, as will be explained hereinafter, to permit the dog to engage the outer surface of the cam 20 and to ride thereon until the flattened portion 202 again approaches the position shown in Fig. 6 at which time the shoulder 208 will engage the shoulder 42 to arrest further rotation of the cams.

Figure 1:
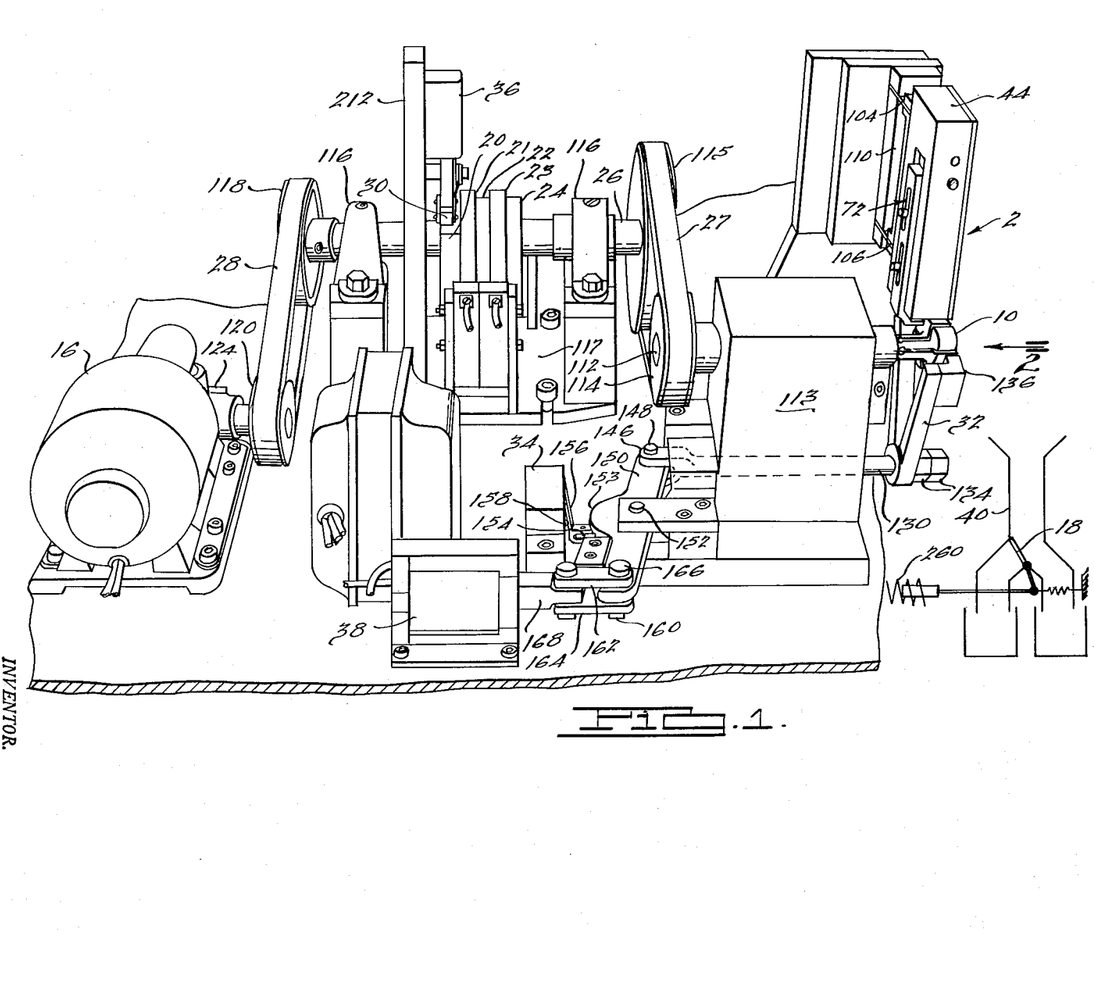
Figure 1 is a perspective view of the mechanical features of the apparatus.
Figure 2:
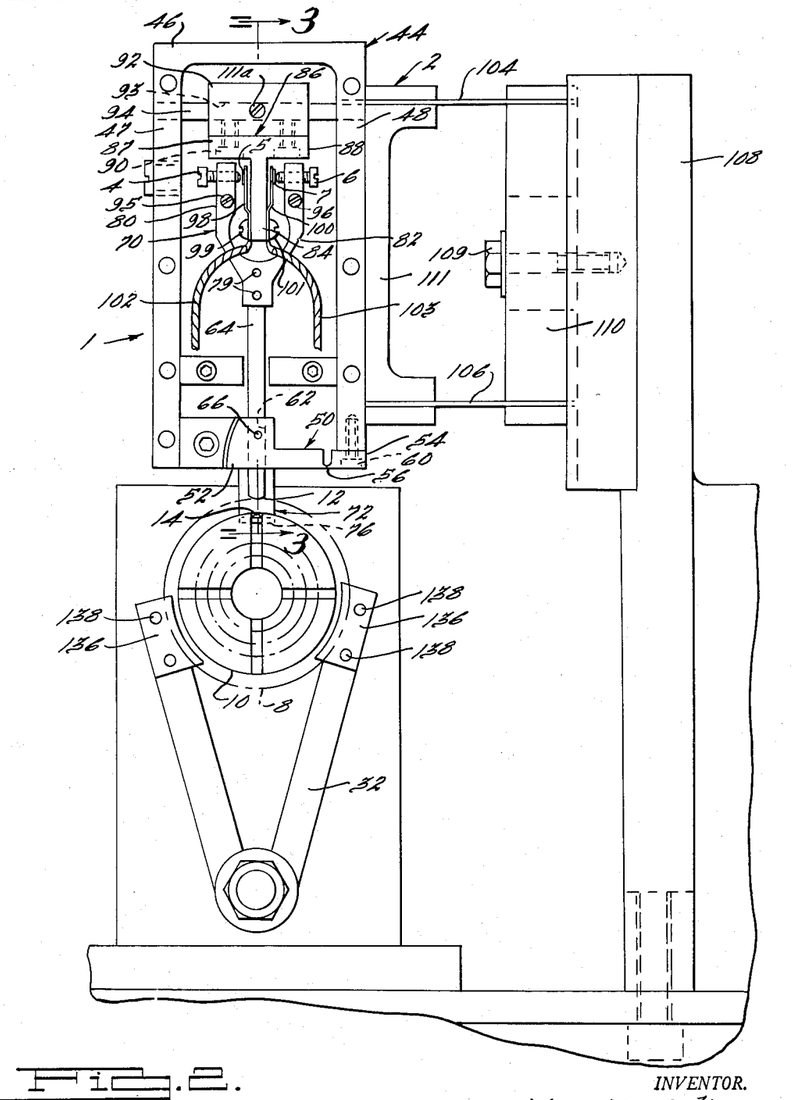
Fig. 2 is a right-hand end view of the apparatus of Fig. 1.
Figure 3:
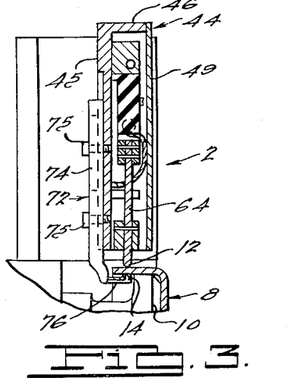
Fig. 3 is a view taken substantially along the line 3—3 of Fig. 2.

The cams 21, 22, 23 and 24 engage the operating pins of limit switches, to be described hereinafter, to initiate the various measuring steps of the electrical circuit of Fig. 8 and to energize the ejecting solenoid 38 to rotate the lever 150 to the position shown in Fig. 1 causing the shaft 130 and its associated V-shaped member 32 to discharge the measured sleeve from the collet 10 for discharge into the chute 40 for passage by the gate 18 into the proper bin.

Figure 7:
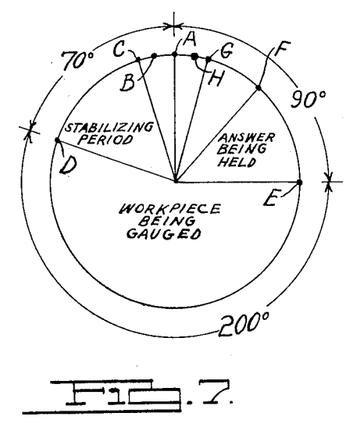
Fig. 7 is a diagrammatic view showing the rotative positions of the cams for operation of the sequencing switches.

Referring more specifically to Fig. 7 the 0° or A point indicates the position of the cams shown in Fig. 6 with the shoulders 42 and 208 in engagement. Rotation of the cams about 7½° (point B) brings the cam follower 250 of the switch 252 onto the enlarged radius portion closing the switch 252 to complete the anode circuit for valves V4 and V5 as will be explained more fully hereinafter. After the cams rotate approximately 15° (point C), the cam follower 230 of limit switch 232 will be in engagement with the enlarged diameter portion of cam 21 causing the limit switch 232 to open and de-energize the solenoid 36 permitting the dog 30 to fall down against the outer surface of the cam 20. After the cams have rotated 55° or a total of approximately 70° (point D), the cam follower 236 of the limit switch 238 will be in engagement with the enlarged radius portion 240 of the cam 22 closing the limit switch 238 to place the valves V4 and V5 in a condition to be rendered conductive by the gauge head 2 to initiate a measuring operation of the circuit of Fig. 8.

The next 200° of rotation of the cams are used to permit the measuring of the concentricity of the wall thickness of the sleeve 22. At the end of this time or 270° of rotation (point E), the cam follower 236 will have moved to the reduced radius portion 256 of cam 22 permitting the switch 238 to open ending the measuring period in which the conducting of valves V4 and V5 may be initiated by the gauge 2 at about the same instant the cam follower portion 242 will have moved to the reduced radius portion 246 of the cam 23 thereby closing the switch 244 and energizing the knockout or ejecting solenoid 38 for removal of the workpiece which has just been measured from the collet 10 into the chute 40.

During the remainder 90° of the single revolution of the cams at point F, the cam follower 250 will enter the flattened portion of the cam 24 to open switch 252 to open the anode circuit of valves V4 and V5 to remove the answer held by the network as to the satisfactoriness of the sleeve just ejected. At point G the cam follower 230 enters the flattened portion of cam 21 permitting the switch 232 to close without effect since at this time switch 34 is open. At point H the cam follower 242 moves to the enlarged radius portion of the cam 23 opening switch 244 and de-energizing the ejecting solenoid 38. At point A the dog 30 arrests further rotation of the cams 20—24.

It will be noted that rotation of the cams 20—24 is limited to 360° for one measuring cycle but, due to the 2:1 ratio of the rotation of the shafts 112 and 26, the shaft 112 will make two revolutions and the measuring of the workpiece or sleeve will have taken place during slightly more than one complete revolution thereof so that its entire surface will have been gauged. If, during the measuring portion of the gauging cycle, both of the sets of contacts 4—5 and 6—7 engage, the gate 18 will be positioned to guide the sleeve through the discharge chute 40 into the rejected material bin. If only one of the sets of contacts 4—5 or 6—7 close, the gate 18 will be in its normal position directing the workpiece through the discharge chute 40 into a bin for receiving acceptable workpieces.

Figures 4, 5, 8:
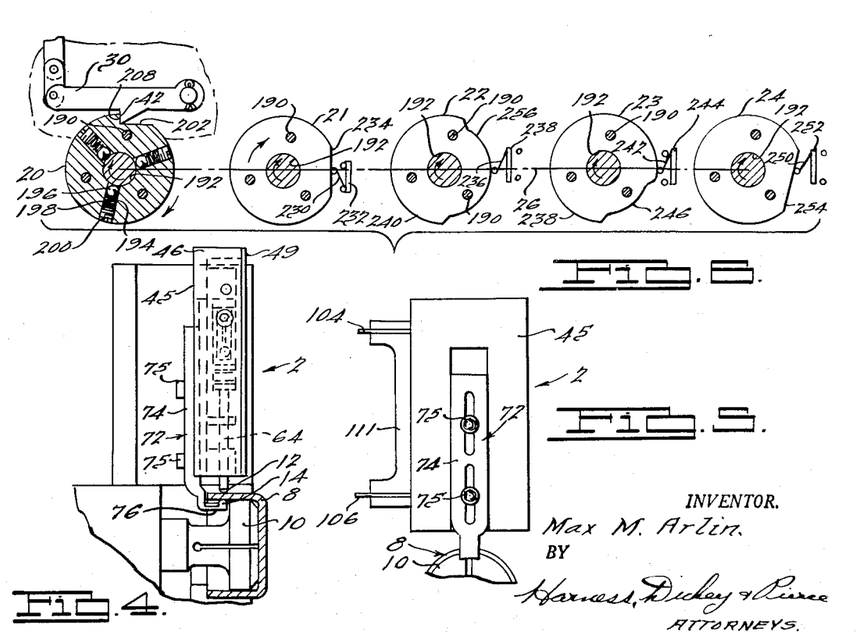
Fig. 4 is a left-hand side view of the gauging head of Fig. 2.
Fig. 5 is a rear view of the gauging head shown in Fig. 4.
Fig. 8 is a schematic view of the electrical circuit of the gauging apparatus.

Referring to Fig. 8 for the details of operation for the electrical network 1 in which certain of the parts therein have already been referred to during the preceding discussion, electrical energy is supplied from a suitable source of supply through the line switches 300 and 302 to the busses 304 and 306 respectively. A primary winding 308 of transformer 310 having secondary windings 312, 314 and 316 is connected between the busses 304 and 306. The windings 312 and 316 are utilized to supply the heater elements of the valves V1, V2, V3, V4 and V5 as indicated by the reference characters $xx$ and $yy$.

The seondary winding 314 is center tapped with its center tapped connection 318 connected to ground and its end terminals connected to the anodes of the dual anode rectifying valve V1 to provide a source of direct current for the valves V2, V3, V4 and V5. In order to provide a more constant D. C. source, the cathode of the valve V1 is connected through with a choke coil 320 to a positive direct current bus 322 and is also connected to the bus 322 through serially connected capacitor 324 and resistor 326. The common junction between the capacitor 324 and resistor 326 connected to ground by the conductor 328 and a condenser 324a is arranged in shunt with resistor 326.

A gas filled discontinuous type valve V4, above referred to, has its anode connected through the energizing winding 330 of relay 334 and through resistors 338 to the positive bus 322. The cathode of the valve V4 is connected through a resistor 342 to a bus 346 which bus is connected through the before-mentioned cam operated switches 238 and 252 to ground and therethrough back to the negative direct current bus 318. A resistor 347 is connected between the positive bus 322 and the common junction of the cathode of the valve V4 and the resistor 342 to control the potential of the cathode of valve V4 with respect to ground. Connected in shunt about the limit switch 238 is a resistor 348. Assuming switch 252 to be closed, opening of the switch 238 inserts the resistor 348 in series with the resistor 347 and so reduces the current flowing through the resistor 347 that the potential of the cathode of valve V4 is raised to a point such that the grid of this tube will hold the valve V4 nonconductive irrespective of the operation of the gauge head 2. Closure of the switch 238 removes the resistor 348 from its series connection with the resistor 347 increasing the current flow therethrough and lowering the potential of the cathode of the valve V4 so that conduction of the valve V4 may be initiated by the gauge head 2. The valve V5 is similarly connected to the busses 322 and 346 and the corresponding elements in such connection are indicated by the same references with the letter "a" added thereto.

With the switches 238 and 252 closed, initiation of the conduction of the valves V4 and V5 is controlled by the gauge head 2 through valves V2 and V3. Since the valve V3 controls the valve V5 in exactly the same manner as the valve V2 controls the valve V4, a description of the connections and circuit elements of V2 will be given and similar numerals with the letter "a" appended will be used to designate corresponding elements associated with valve V3. The anode of valve V2 is connected to the positive bus 322 through a resistor 350 and its cathode is connected to ground through resistor 354 to complete an anode circuit thereof. The grid of the valve V2 is connected to the common point 357 of the pair of serially connected potentiometer resistor elements 358 and 360 connected between the conductor 322 and ground whereby the potential of the grid of the valve V2 is maintained at a potential positive with respect to ground in accordance with the potential drops across the elements 358 and 360. The grid of the valve V2 is connected through a resistor 364 to the contact 5 of the gauge head 2. The gauge head contact 4 associated therewith is connected to ground as above described so that upon closure of the contacts 4—5, the resistor 364 is placed in parallel circuit with the resistor 360 thereby considerably reducing the resistance to ground from the point 357 increasing current flow through the resistor element 358 and the potential drop thereacross thereby lowering the potential of the grid of the valve V2. Since the valve V2 is of the high vacuum type in which the current flow therethrough is controlled by the grid to cathode bias voltage, such lowering of this bias voltage decreases the current flow therethrough. Decrease of the current flow through the valve V2 decreases the potential drop across the resistor 350. Since the grid of valve V4 is connected through a condenser 366 and resistor 368 to the anode of valve V2, such drop in potential will raise the grid potential of the valve V4 causing the valve to conduct. The valve V4 is of the gas filled type in which the grid is effective only to control initiation of conduction of the valve and is ineffective to influence conduction once the valve has become conductive and therefore once it is rendered conductive it will continue to conduct until current flow therethrough is stopped due to opening of the switch 252 in the anode circuit thereof.

The conduction of valve V4 energizes the relay 334 causing it to move its single arm 370 from engagement with contact 372 into engagement with contact 374. The circuits controlled by the relays 334 and 334a are energized by a transformer 376 having its primary winding 378 connected between the busses 304 and 306 and its secondary winding 380 connected to the busses 382 and 384. The arm 370 of relay 334 is connected to bus 382 while the contact 374 is connected by conductor 386 to the arm 370a of relay 334a and also through a resistor 388 and indicating lamp 390 to the bus 384. Since the contact 372 is connected by means of conductor 392 to contact 372a of the relay 334a, the energization of the relay 334 merely transfers the energizing circuit from a circuit extending through the contact 372, conductor 392, contact 372a and arm 370a to the resistor 388 to a circuit extending through contact 374 and conductor 386 to the resistor 388 and the lamp 390 remains energized and energization of relay 334 is without effect except so long as the relay 334a remains de-energized.

The other contact 374a of the relay 334a is connected to the bus 384 by two parallel circuits, one of which includes the solenoid 260 for actuating the segregating gate 18 and the other of which includes a current limiting resistor 396 and an indicating lamp 398. Therefore, if both of the relays are energized moving arm 370 into engagement with contact 374 and arm 370a into engagement with contact 374a, a circuit will be established from the bus 382 through the arm 370, contact 374, conductor 386, arm 370a, contact 374a and resistor 396 to the reject indicating lamp 398 and therethrough to the bus 384 and through the same path to the contact 374a and then through the solenoid 260 and therethrough to the bus 384.

It will be apparent from Fig. 8 that switch 34 and 232 jointly control the energization of the dog solenoid 36 through an obvious circuit energized by the busses 382 and 384. The switch 244 likewise controls the energization of the ejecting solenoid 38 through an obvious circuit energized by the busses 382 and 384.

To operate the apparatus,

Switches 300 and 302 are closed to energize the network 1 of Fig. 8 which immediately energizes the motor 16 through an obvious circuit and energizes the transformer 310 whereby its windings 312 and 316 are effective to energize the valve heaters. After a sufficient time period has elapsed to permit the heaters to render the valves V1 through V5 in an operating condition, the apparatus is ready for measuring sleeves. Sleeve 8 is placed on the collet 10 in any desired manner either automatically through conventional apparatus not shown or manually. Insertion of the sleeve 8 on the collet 10 causes the end of the sleeve 8 to engage the wear pads of the arm 32 and to move the arm 32 and shaft 130, to which it is attached, inwardly to rotate the lever 150 counterclockwise (Fig. 1). Such rotation of lever 150 causes the cam 153 thereof to move the flexible arm 156 to the left (Fig. 1) pushing the actuating button 158 inwardly of the switch 34 thereby closing the switch 34 to complete an obvious energizing circuit for the dog solenoid 36 from the bus 382 through the now closed switch 34, normally closed switch 232, solenoid 36 to the bus 384. Energization of the dog solenoid 36 causes its armature to lift the dog 30 whereby its shoulder 42 is moved outwardly of the shoulder 208 of the cam 20 to permit the balls 196 to move with the lay shaft 26 and rotate the cams 20—24.

During approximately the first 7½° of rotation of the cams, point B of Fig. 7, the cam 24 closes the switch 252, as described above, thereby completing the anode circuits for the valves V4 and V5 so that, when the proper grid to cathode bias voltage has been established therein, these valves may be rendered conductive. During this initial period, however, the switch 238 is open, placing the resistor 348 in series with the resistor 347 which limits the current flow through the resistor 347. Such limited current holds the potential of the cathode of the valve V4 sufficiently elevated with respect to that of the grid that, even if the valve V2 conducts the grid cannot be raised in potential sufficiently to permit conduction of the valve V4. The cathode of the valve V5 is similarly elevated in potential due to the reduced current flow through the resistor 347a to prevent the valve V3 from initiating conduction of the valve V5. As long as the switch 238 is open, the valves V4 and V5 will not conduct irrespective of any making and breaking of the contacts 4—5 and 6—7 of the gauge head 2.

This condition of operation of the switches 238 and 252 continues up to the point D or for the initial 70° rotation of the cams 20—24 and provides the time period in which the gauge head can accommodate itself to shock of having the sleeve wall inserted between its anvils 12 and 14 which may have occurred as the sleeve 8 was being inserted on the collet 10. Sometime during this initial 70° revolution period, for example at 15°, point C, the switch 232 is opened by the cam 21 to de-energize the circuit to the dog solenoid 36 permitting the dog 30 to drop downwardly and the portion thereof having the shoulder 42 then drops down on the outer peripheral cylindrical surface of the cam 20 so that at the completion of 360° rotation of the cams 20—24 the shoulder 42 will again engage the cam shoulder 208 to stop rotation of the cams 20—24.

During the 200° rotation of the cams 20—24 subsequent to the initial 70° of rotation, the workpiece is being gauged. At the initiation of this 200° period, namely point D, the cam 22 closes the switch 238 shorting out the resistor 348 and increasing current flow through the resistors 347 and 347a. Such increased current increases the potential drops across the resistors 347 and 347a thereby sufficiently reducing the potential of the cathodes of the valves V4 and V5 to render conduction of the valves V4 and V5 responsive to the valves V2 and V3. During this 200° period, the sleeve 8 is rotated at least a complete revolution due to the before-mentioned 2 to 1 speed ratio of the shafts 112 and 26.

As the sleeve 8 rotates, the position of the movable anvil 12 with respect to the fixed anvil 14 will be determined by the wall thickness of the sleeve instantaneously presented between the two anvils. Increase of wall thickness causes the beam portion 52 to rock about the flexible bridge 56 in a clockwise direction while a decrease in wall thickness will cause rocking of the beam portion 52 in the opposite direction.

Upon initial insertion of the sleeve between the anvils 12 and 14, the contact 4 will engage contact 5 and move the T-shaped member 86 and block 92 to an adjusted position. Since during the initial 70° of rotation of the cams 20—24, the sleeve will also be rotating the relative position of the contacts at the start of the 200° measuring period and will be indeterminate depending upon the particular sleeve then on the collet 10. If the sleeve is within the desired tolerances, the block 92 will be in its adjusted position. If out of tolerance it may have been moved due to the rocking of the beam 50. For the purpose of this explanation it will be assumed that the beam 50 is in a position in which both sets of contacts 4—5 and 6—7 are open. If now continued rotation of the sleeve 8 brings a wall section of slightly greater thickness between the anvils 12 and 14, the beam end 52 will rock in a clockwise direction and if the increase of thickness is sufficient will bring contact 4 into engagement with contact 5 to complete a circuit through the resistor 364 in parallel with the resistor element 360 to increase the current flow through the resistor 358 which increases the potential drop across this resistor 358.

An increase in potential drop across the resistor 358 lowers the bias potential between the grid and cathode of the valve V2, which is of the high vacuum type, to decrease the current flow through the anode resistor 350. Decrease in current flow through the anode resistor 350 decreases the potential drop thereacross raising the potential of the capacitor 366 and consequently that of the grid of the valve V4. This increase in potential is sufficient to initiate conduction of the valve V4 which will remain conductive until the switch 252 opens. Upon being rendered conductive, the valve V4 establishes a circuit from the bus 322 through the resistor 338, winding 330 of the relay 334, valve V4, resistor 342, now closed switches 238 and 252 to ground back to the other side of the direct current supply. Energization of the relay 334 moves its arm 370 out of engagement with the contact 372 into engagement with the contact 374. Under the particular conditions specified the valve V5 will not be conducting and no function other than the establishment of a preparatory circuit is accomplished by such energization.

If, however, the sleeve 8 contains a section of wall of a lesser thickness which differs from the above-mentioned greater thickness by an amount greater than the allowed wall thickness tolerance or eccentric tolerance, the beam portion 52 will rotate counterclockwise about the bridge 56 causing the contact 6 to engage the contact 7 to complete a circuit through the resistor 364a in parallel with the resistors 360a increasing the voltage drop across the resistor 350a for decreasing current flow through the high vacuum valve V3.

This decrease in current flow through the valve V3 decreases the potential drop across the resistor 350a thereby raising the potential of the grid of the valve V5 sufficiently with respect to its cathode to initiate conduction of the valve V5 which like valve V4 will remain conductive until opening of the switch 252. Conduction of the valve V5 establishes a circuit from the bus 322 through resistor 338a, winding 330a of the relay 334, valve V5, resistor 342a and now closed switches 238 and 252 to ground and therethrough back to the other side of the direct current supply. Energization of the relay 334a moves its arm 370a out of engagement with the contact 372a and into engagement with the contact 374a. If, as stated above, the valve V4 has been rendered conductive, a circuit will now be established from the bus 382, arm 370, contact 374, conductor 386, arm 370a, contact 374a and then in parallel circuit through the gate actuating solenoid 260 and rejection indicating lamp 398 having the current limiting resistor 396 in series therewith.

If during the measuring period the contacts 4—5 have not closed, the valve V4 will not be conducting and conduction of the valve V5 with its consequent energization of the relay 334a will not complete a circuit to the segregating gate solenoid 360 and the reject indicating lamp 398 since the conductor 386 will not be connected to the bus 382. Conduction of the valve V5 with the conduction of the valve V4 is without effect except to extinguish the indicating lamp 390.

It may, therefore, be seen that unless both sets of contacts 4—5 and 6—7 of the gauge head are closed during the 200° gauging period of the cam shaft 26 indicating a difference in wall thickness of the sleeve 8 greater than the tolerated difference, the segregating gate solenoid 260 will not be energized and the gate 18 will remain in its normal position to direct the sleeves 8 through the chute 40 into the "go" or satisfactory bin. If both sets of contacts 4—5 and 6—7 have been closed during the gauging or measuring period, the solenoid 260 will be energized and actuate gate 18 to direct the sleeve into the "no go" or reject bin. At the end of the 200° gauging period, point E of Fig. 7, the cam 22 again opens the switch 238 to render the valves V4 and V5 insensitive to actuate by the gauge head 2 through the valves V2 and V3. At this same point or approximately this same point, the cam 23 permits the normally closed switch 244 to close thereby completing an energizing circuit from the bus 304 through the switch 244, rejected solenoid 38 to the bus 306. Energization of the solenoid 38 rotates the lever 150 in a clockwise direction (Fig. 1) about its pivot pin 152 moving the shaft 130 and the arm 132 to the right to eject the measured sleeve which then falls down into the chute 40 and passes beyond the segregating gate 18 into the "go" or "no go" bins depending upon the position of the segregating gate 18.

During this time period, the switch 252 remains closed enabling the network 1 to retain the answer as determined by the gauge head 2 during the 200° gauging period. After sufficient time has elapsed for the piece to pass the segregating gate 18, for example, point F of Fig. 7, the cam 24 is rotated sufficiently to permit the normally open switch 252 to open breaking the anode circuit through the valves V4 and V5 and extinguishing these valves, if they had been rendered conductive during the measuring period. With the valves V4 and V5 extinguished, the relays 334 and 334a will either remain in or move back to their de-energized positions so that the arms 370 and 370a engage respectively the contacts 372 and 372a. Subsequently at point G the cam 21 permits the normally closed switch 232 to close preparatory to the next operation. Since at this time the switch 234 is open due to rotation of the cam 21 no change in energization of the dog solenoid 36 occurs. Subsequently at point H the cam 23 opens the normally closed switch 244 de-energizing the eject solenoid 38 without effect but preparing the apparatus for reoperation upon insertion of a new sleeve 8. Subsequent sleeves are measured in the same manner.

If the sleeve 8 is not exactly concentric with the collet 10 rotation thereof will merely move the gauge head 2 in vertical movement on its upper and lower strip arms 104 and 106 without effecting any operation of the gauge head contacts and the apparatus is therefore not affected by any errors which may be introduced due to the manner in which the sleeve 8 happens to be placed on the collet 10 and will accurately respond to difference in wall thickness of the sleeve 8 or the eccentricity of the two surfaces.

The apparatus will measure eccentricity or difference in wall thickness and magnitude of the wall thickness is immaterial since upon initiating insertion of the wall between the anvils 12 and 14, the shaft 64 is rotated sufficiently as determined by the wall thickness being presented by the anvils 12 and 14 to slide the block 92 along the shaft 94 into a position required thereby. Subsequent to this movement of the block 92 and the stabilization period of the wall tolerance the actuation of the network 1 is determined solely by the distance between the contacts 4 and 6, assuming that the distance between the contacts 5 and 7 remains fixed.

In order to measure sleeve 8 with any degree of rapidity, the collet 10 must rapidly rotate the sleeve between the anvils 12 and 14. The contacts in the gauge head 2 must be operative to positively control the bias on the valves V2 and V3 to initiate conduction of the valves V4 and V5 upon any closing of the contacts 4—5 and 6—7. It has been found that more rapid measurements may be obtained if the contacts 5 and 7 are resiliently mounted as disclosed in the drawings. Such a mounting eliminates bouncing of the contacts and insures a positive control of the valves by the gauge head 2.

While only a single embodiment of this invention is shown in accordance with the patent statutes, it is to be distinctly understood that the embodiment may be in many different forms and still retaining this invention.

What is claimed and is desired to be secured by United States Letters Patent is as follows:

1. In an apparatus for measuring the concentricity of two cylindrical wall surfaces of a workpiece, a collet adapted to support such workpiece, means for rotating said collet, a gauge head, a pair of parallel spaced arms of substantially equal length, a support carrying corresponding ends of said arms, means securing the opposite corresponding ends of said arms to said gauge head whereby said head is movably carried by said support, a first anvil adapted to engage one of such workpiece surfaces, means fixedly securing said anvil to said gauge head whereby the position of said gauge head is determined by such one workpiece surface, a second anvil, a switch actuating member pivotally carried by said head, means securing said actuating member to said second anvil whereby relative movement of said anvils pivots said actuating member, a supporting member movably carried by said head, means on said actuating member and operable to move said supporting member upon relative movement of said anvils in one direction, a pair of switch contacts, one of said contacts being carried by said actuating member, the other of said contacts being carried by said supporting member, said contacts being relatively movable upon relative movement of said anvils in a second direction to control an electric circuit, an electrical network including said circuit and having an output circuit, said network further including means for controlling said output circuit from a first to a second operating condition as a consequence of a change in said first-named circuit, and means for maintaining said output circuit in said second operating condition subsequent to said output circuit being placed in said second operating condition by said first-named circuit.

2. In a gauging device for checking the concentricity of two concentric surfaces of a workpiece, a body, a first workpiece engaging element rigidly carried by said body and adapted to engage one of the surfaces of such workpiece, a second workpiece engaging element carried by said body and movable relative to said first element, a first switch means actuated to one position by relative movement of said elements in one direction, a second switch means actuated to a first position by relative movement of said elements in a second direction, means supporting both said switch means for bodily movement relative to said body, a rotatable workpiece supporting member for supporting such workpiece whereby a portion thereof is between said elements, means for rotating said supporting member, a first electrical circuit including said first switch means and operable to be rendered effective upon movement of said first switch means to said one position to actuate a first control device, a second electrical circuit including said second switch means and operable to be rendered effective upon movement of said second switch means to said first position to actuate a second control device, a third switch means operable to render said first and said second switch means ineffective to actuate said control devices, and means actuated as a consequence of such worpiece being placed between said elements for actuating said third switch means to render said first and second switch means effective to actuate said devices.

3. In a gauging device for checking the concentricity of two concentric surfaces of a workpiece, a supporting structure, a body, a pair of spaced substantially parallel resilient members carried by said structure and extending outwardly therefrom, means securing extending portions of said members to said body whereby said body is positioned for movement relative to said structure, a first workpiece engaging element rigidly carried by said body and adapted to engage one of the surfaces of such workpiece, a second workpiece engaging element carried by said body and movable relative to said first element, a first switch means actuated to one position by relative movement of said elements in one direction, a second switch means actuated to a first position by relative movement of said elements in a second direction, means supporting both said switch means for bodily movement relative to said body, a rotatable workpiece supporting member carried by said structure for supporting such workpiece with a portion thereof between said elements, means for rotating said supporting member, a first electrical circuit including said first switch means and operable to be rendered effective upon movement of said first switch means to said one position to actuate a first control device, a second electrical circuit including said second switch means and operable to be rendered effective to actuate a second control device upon movement of said switch means to said one position, a third switch means operable to render said first and said second switch means ineffective to actuate said control devices, and means actuated as a consequence of such workpiece being placed between said elements for actuating said third switch means to render said first and second switch means effective to actuate said control devices.

4. In a gauging device for checking the concentricity of two concentric surfaces of a workpiece, a supporting structure, a body, a pair of spaced substantially parallel resilient members carried by said structure and extending outwardly therefrom, means securing extending portions of said members to said body whereby said body is positioned for movement relative to said structure, a first workpiece engaging element rigidly carried by said body and adapted to engage one of the surfaces of such workpiece, a reed having an end portion rigidly carried by said body, a second workpiece engaging element carried by said reed and movable relative to said first element, a first pair of spaced contacts carried by said reed, a contact carrying member, said contact carrying member having a portion extending between said pair of contacts, means securing said contact carrying member for sliding movement on said body in a direction defined by a line between the contacts of said pair, a second pair of contacts carried by said portion individually on opposite sides thereof and individually engageable by said first pair of contacts upon flexing of said reed, said first pair of contacts being spaced apart a distance greater than that of said second pair, a rotatable workpiece supporting member journaled in said structure for supporting such workpiece whereby a portion thereof is between said elements, means for rotating said supporting member, a first electrical circuit including a first contact of each of said pairs of contacts and operable to be rendered effective upon engagement of said first contacts upon flexing of said reed in one direction, a second electrical circuit including a second contact of each of said pairs of contacts and operable to be rendered effective upon engagement of said second contacts upon flexing of said reed in a second direction, a cam rotatable with said workpiece supporting member, a third switch means actuatable by said cam for rendering said first and said second switch means effective and ineffective to render said first and said second circuits effective, and means actuated as a consequence of such workpiece being placed between said elements for establishing rotation of said cam.

5. In a gauge head, a supporting body, a bendable reed carried by said body, a movable member slidably carried by said body and having spaced faces and tending to remain in any position to which it is slidably moved, a contact, means resiliently supporting said contact on said slidable member and normally holding said contact in spaced relation to one of said faces, a yoke carried by and movable with said reed, said yoke having spaced arms between which said faces extend, a locating member carried by said body and having a first workpiece engaging element, and a second workpiece engaging element carried by said reed and movable relative to said first engaging element by such workpiece to flex said reed, one of said yoke arms being operable upon flexing of said reed in one direction to move said slidable member, the other of said arms being engageable with said contact upon flexing of said reed in a second direction.

6. In a gauge apparatus, a supporting structure, a gauge head body, a pair of spaced substantially parallel members of substantially equal length secured at one end portion to said body and at the opposite end portion to said structure, said members being so constructed and arranged as to permit relative movement of said body and said structure, a bendable reed carried by said body, a movable member slidably carried by said body and having spaced faces, a contact, means resiliently supporting said contact on said slidable member and normally holding said contact in spaced relation to one of said faces, a yoke carried by and movable with said reed, said yoke having spaced arms between which said faces extend, a locating member carried by said body and having a first workpiece engaging element, and a second workpiece engaging element carried by said reed and movable relative to said first engaging element by such workpiece to flex said reed, one of said yoke arms being operable upon flexing of said reed in one direction to move said slidable member in a direction to carry said contact toward and from said arms, the other of said arms being engageable with said contact upon flexing of said reed in a second direction.

7. In a gauge apparatus, a supporting structure, a gauge head body, a bendable reed carried by said body, a movable member slidably carried by said body and having spaced faces, a contact, means resiliently supporting said contact on said slidable member and normally holding said contact in spaced relation to one of said faces, a yoke carried by and movable with said reed, said yoke having spaced arms between which said faces extend, a workpiece supporting member, means supporting said body for movement relative to said workpiece supporting member, a locating member carried by said body in fixed relation thereto and having a first workpiece engaging element whereby the position of said body with respect to such workpiece may be determined, and a second workpiece engaging element carried by said reed and movable relative to said first engaging element by such workpiece to flex said reed, one of said yoke arms being operable upon flexing of said reed in one direction to move said slidable member in a direction to carry said contact toward and from said arms to adjust the position of the slidable member in accordance with the characteristic of the particular workpiece engaging said elements, the other of said arms being engageable with said contact upon flexing of said reed in a second direction to actuate a control circuit.

8. In a gauging apparatus, a pair of relatively movable workpiece engaging elements, a workpiece supporting member adapted to support a workpiece between said elements, means for moving said member relative to said elements whereby an extended portion of a workpiece carried thereby passes between said elements, a first pair of contacts fixed with relation to each other and simultaneously movable by one of said elements upon relative movement of said elements, a reciprocal member, a second pair of contacts carried by said reciprocal member and cooperable with said first pair of contacts to control a pair of circuits, said second pair of contacts being normally spaced relative to said first pair of contacts such that at one relative position of said reciprocal member and of said workpiece engaging elements each of said first pair of contacts is out of electrical contact with each of said second pair of contacts, said pairs of contacts being arranged such that relative movement of said elements in one direction will cause engagement of first contacts of each of said pairs of contacts to control a first of said pair of circuits and relative movement of said elements in a second direction will cause engagement of second contacts of each of said pairs of contacts to control a second of said pair of circuits, switch means actuated by said member moving means for maintaining both said circuits ineffective to respond to said pairs of contacts, said switch means being effective solely subsequent to the insertion of a workpiece between said elements to render said circuits effective to respond to said pairs of contacts, and a rejection circuit controlled by both said pairs of circuits and including timing means responsive to engagement of both said first contacts and said second contacts of said pairs of contacts within a predetermined time.

9. In a gauging apparatus, a pair of relatively movable workpiece engaging elements, a workpiece supporting member adapted to support a workpiece between said elements, means for moving said member relative to said elements whereby an extended portion of a workpiece carried thereby passes between said elements, a first pair of contacts, a second pair of contacts, said first pair of contacts being bodily movable by one of said elements upon relative movement of said elements, a movable contact carrying member, said second pair of contacts being carried by and bodily movable with said contact carrying member, said second pair of contacts being cooperable with said first pair of contacts to control a pair of circuits, said second pair of contacts being normally spaced relative to said first pair of contacts such that at one relative position of said contact carrying member and of said workpiece engaging elements each of said first pair of contacts is out of electrical contact with each of said second pair of contacts, said pairs of contacts being arranged such that relative movement of said elements in one direction will cause engagement of first contacts of each of said pairs of contacts to control a first of said pair of circuits and relative movement of said elements in a second direction will cause engagement of second contacts of each of said pairs of contacts to control a second of said pair of circuits, switch means actuated by said member moving means for maintaining both said circuits ineffective to respond to said pairs of contacts, and means actuated as a consequence of the insertion of a workpiece between said elements to actuate said switch means to render said circuits effective to respond to said pairs of contacts.

10. In an apparatus for measuring the concentricity of two cylindrical wall surfaces of a workpiece, a support, a collet adapted to support such workpiece, means for rotatably carrying said collet on said support, a gauge head, a pair of parallel spaced oscillatable arms of substantially equal length, means securing corresponding ends of said arms on said support, means securing the opposite corresponding ends of said arms to said gauge head whereby said head is movably carried by said support, a first anvil adapted to engage one of such workpiece surfaces, means fixedly securing said anvil to said gauge head whereby the position of said gauge head is determined by such one workpiece surface, a second anvil, a switch actuating member pivotally carried by said head, means securing said switch actuating member to said second anvil whereby relative movement of said anvils pivots said switch actuating member, a contact supporting member movably carried by said head, means on said switch actuating member and operable to move said contact supporting member upon relative movement of said anvils in one direction, a pair of switch contacts, one of said contacts being carried by said switch actuating member, the other of said contacts being carried by said contact supporting member, said contacts being relatively movable upon relative movement of said anvils in a second direction to control an electric circuit.

11. In a gauging head for controlling an electrical gauging network, a supporting structure, a track carried by said structure, adjustable means including a carriage carried by and movable along said track and provided with a pair of contacts movable therewith relative to said structure, an arm carried by said structure and provided with a flexible portion whereby a portion of said arm is movable relative to said structure, and means including a second pair of contacts carried by said arm portion and movable therewith in a direction generally coinciding with the direction of movement of said carriage, said second pair of contacts being engageable with and disengageable from the first pair of contacts during movement of said arm, and said arm also being cooperable with said carriage to move the carriage along said track as a consequence of movement of said arm portion, whereby after the carriage has been moved along the track, the angular position of the arm during subsequent movements of the arm required in order to cause engagement and disengagement of the pairs of contacts varies in accordance with the position of the carriage.

12. The combination of claim 11 in which one of said means is provided with an extending portion and the pair of said contacts carried thereby are located on opposite sides of said extending portion, and in which the other of said means includes a pair of elements spaced on opposite sides of said extending portion.

13. A gauging head comprising, a supporting body, a track carried by said body, a carriage slidably carried on said track and including an extending portion, a pair of contacts resiliently carried by said extending portion on opposite sides thereof and spaced longitudinally of the path of travel of the carriage along the track, an arm of such proportions that it is relatively inflexible except for a hinging portion securing the arm to the body and permitting movement of said arm in the same general direction as the carriage, a yoke actuatable by said arm in a direction generally corresponding to said path of travel of said pair of contacts, and a second pair of contacts carried by said yoke and spaced more widely than the contacts of said first-mentioned pair and spacedly overlapping and individually engageable with said contacts of the first-mentioned pair in response to movement of the arm and yoke, the carriage being slidable along the track in response to continuing movement of the arm in a contact-closing direction after contact engagement, and the carriage tending to remain in any position to which it is so moved.

14. The combination of claim 13 including a base structure, a rotatable workpiece support carried by said base structure, means resiliently supporting said body on said base structure for movement toward and away from said workpiece support, a first anvil member rigidly carried by said body and engageable with a workpiece carried by said workpiece support for positioning said body relative to such workpiece, and a second anvil carried by said arm and engageable with a second portion of such workpiece to relatively position said arm hinging portion with respect to one another and thereby control the relative angular positioning of the arm.

15. In a gauge head, a body, a first workpiece engaging element rigidly carried by said body and adapted to engage one of the surfaces of a workpiece, a reed having an end portion rigidly secured to said body and having a free portion, a second workpiece engaging element carried by said free portion and movable relative to said first element to flex said reed, a first pair of spaced contacts carried by said reed free portion, a contact carrying member, said contact carrying member having a portion extending between said pair of contacts, a first contact carried by said contact carrying member on one side of said member portion, a second contact carried by said contact carrying member on the opposite side of said contact carrying member portion, one of said pair of contacts being engageable with said first contact upon flexing of said reed in one direction, another of said pair of contacts being engageable with said second contact upon flexing of said reed in a second direction, means freely supporting said contact carrying member for sliding movement in said body in a direction defined by a line between the contacts of said first pair of contacts whereby movement of said first engaging element is effective to adjust the relative position of said contact carrying member relative to said body, and means for positioning said pair of contacts apart greater than the distance between said first and said second contacts.

16. The combination of claim 15 in which said body is movably supported on a pair of spaced substantially parallel flexible elongated members.

References Cited in the file of this patent

UNITED STATES PATENTS

| | | |
|---|---|---|
| 1,911,656 | Van Benschoten | May 30, 1933 |
| 2,000,519 | Johns | May 7, 1935 |
| 2,011,931 | Dreyer | Aug. 20, 1935 |
| 2,018,399 | Engst | Oct. 22, 1935 |
| 2,254,812 | Aller | Sept. 2, 1941 |
| 2,312,357 | Odquist et al. | Mar. 2, 1943 |
| 2,327,629 | Fedorchak | Aug. 24, 1943 |
| 2,412,380 | Aller | Dec. 10, 1946 |
| 2,523,555 | Boosey | Sept. 26, 1950 |
| 2,531,317 | Baney et al. | Nov. 21, 1950 |
| 2,560,446 | Jagen | July 10, 1951 |
| 2,569,564 | Gulliet | Oct. 2, 1951 |
| 2,584,714 | Kirkpatrick | Feb. 5, 1952 |
| 2,587,774 | Shack | Mar. 4, 1952 |
| 2,632,545 | Schubert | Mar. 24, 1953 |
| 2,645,341 | Diamond | July 14, 1953 |